(12) United States Patent
Numeroli et al.

(10) Patent No.: US 7,288,904 B2
(45) Date of Patent: Oct. 30, 2007

(54) CENTRALIZED CONTROL DEVICE FOR CONTROLLING THE APPLICATION OF VOLTAGE TO A LOAD PROVIDED WITH A POWER FACTOR CORRECTION CAPACITOR

(75) Inventors: Renato Numeroli, Varese (IT); Luca Porta, Mesero (IT)

(73) Assignee: Reverberi Enetec S.r.l., Castelnovo ne Monti (RE) (IT)

( * ) Notice: Subject to any disclaimer, the term of this patent is extended or adjusted under 35 U.S.C. 154(b) by 351 days.

(21) Appl. No.: 10/504,176

(22) PCT Filed: Feb. 13, 2003

(86) PCT No.: PCT/IB03/00466

§ 371 (c)(1),
(2), (4) Date: Oct. 18, 2004

(87) PCT Pub. No.: WO03/069962

PCT Pub. Date: Aug. 21, 2003

(65) Prior Publication Data

US 2005/0062437 A1   Mar. 24, 2005

(30) Foreign Application Priority Data

Feb. 15, 2002 (IT) .................... TO2002A0135

(51) Int. Cl.
*H05B 37/00* (2006.01)
(52) U.S. Cl. ..................................... 315/312
(58) Field of Classification Search ............... 315/247, 315/209 CD, 291, 307, 224, 312, 313, 322
See application file for complete search history.

(56) References Cited

U.S. PATENT DOCUMENTS 4,792,285 A * 12/1988 Chapman et al. ........... 417/206
6,437,518 B1 * 8/2002 Ito et al. ..................... 315/290
6,552,494 B2 * 4/2003 Randazzo et al. .......... 315/106

* cited by examiner

*Primary Examiner*—Shih-Chao Chen
*Assistant Examiner*—Minh Dieu A
(74) *Attorney, Agent, or Firm*—Levine & Mandelbaum

(57) ABSTRACT

A centralized device for supply voltage control of a load with power factor correction condensers for lighting engineering applications has an array converter for obtaining a portion of power, with a plurality of switches located between the network sinusoidal supply and the load. The centralized device has controlling and regulating means for managing both the activation and deactivation states of the switches of the array converter so as to avoid sudden voltage changes across the load and provide for control of the load voltage.

19 Claims, 4 Drawing Sheets

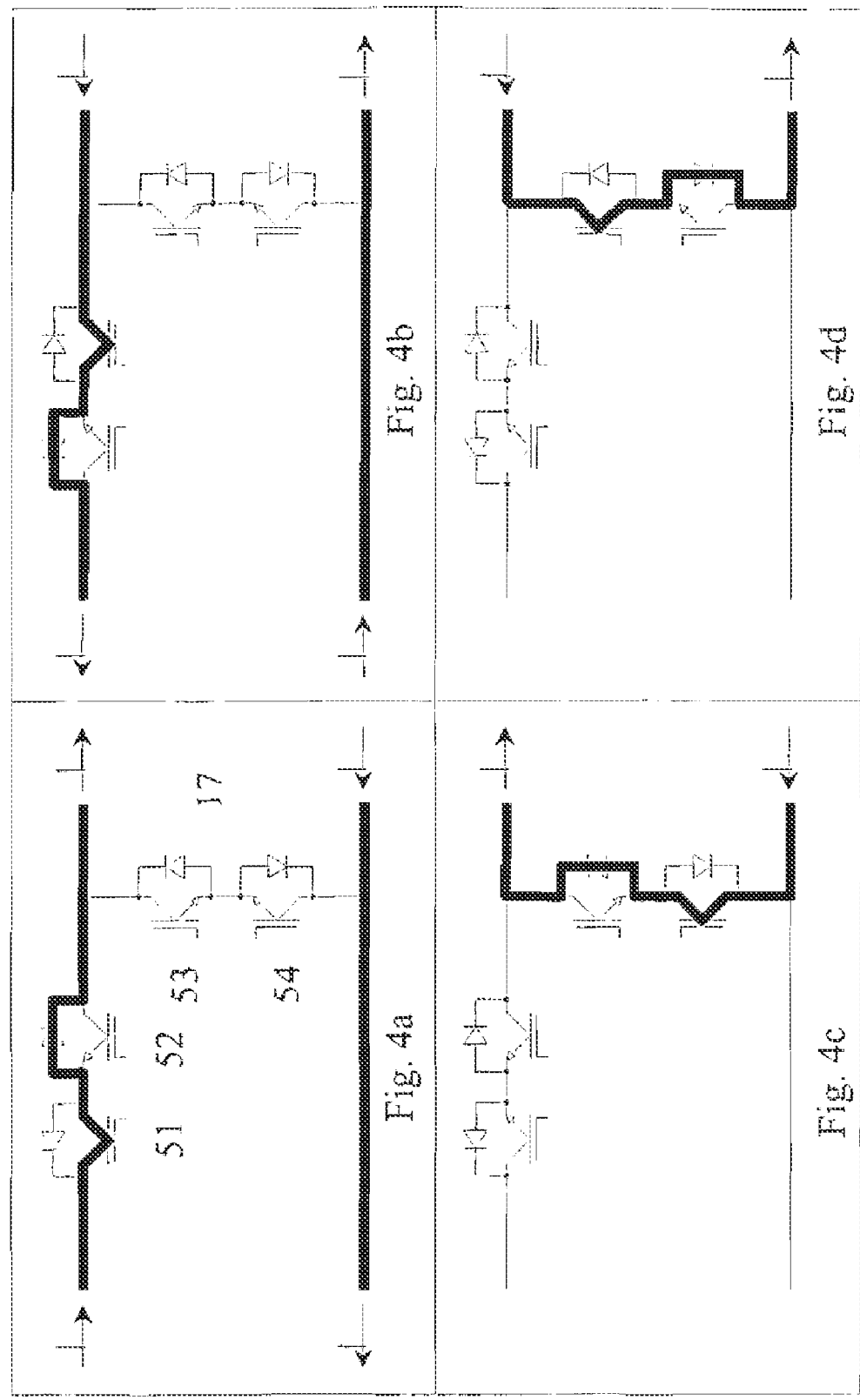

CENTRALIZED CONTROL DEVICE FOR CONTROLLING THE APPLICATION OF VOLTAGE TO A LOAD PROVIDED WITH A POWER FACTOR CORRECTION CAPACITOR

BACKGROUND OF THE INVENTION

The present invention relates to a centralized controller for controlling the voltage applied to a load having power factor correction capacitors, in particular, for lighting engineering applications. The controller has a power regulator in the form of a converter, which includes a plurality of switching devices located between the AC power supply network or grid and the load.

Street lighting systems, or those systems provided for large sport, industrial, commercial or educational areas, should be able to change their lighting power depending on their real utilization requirements, so as to obtain a considerable saving of electric power and extend lamps life.

Common systems for reducing the lighting power are based on electromagnetic devices, such as transformers with sockets or VARIAC, or on the use of electronic controllers. Both cases are subject to utilization restrictions. In the instance of electromagnetic controllers, these restrictions are basically ascribable to the dimensions and weights of the transformers; a further technical restriction is due to the limited number of applicable sockets connected to a transformer, hindering in practice the possibility of controlling the supply voltage output with a higher precision than a few percentage points. In the case of electronic controllers, two different techniques are used, i.e. the former providing generation of the output voltage through the gating of a set of amplitude modulated voltages impulses (PWM), the latter acting through application of a portion of the supply voltage to the load by means of the so-called phase control technique or also phase cut-off. Both solutions require sudden changes in the voltage applied to the load, which hinder their use in the case of improved loads, i.e. loads fitted with power factor optimizing capacitors, which is a usual condition for high performance lamps with very low power factors.

So far, electronic solutions have required the removal of the capacitive behaviour of the load, or removal of the power factor correction capacitors themselves, i.e. a method adopted when using phase cut-off controllers requiring a current increase in the system, or introducing appropriate filters, i.e. the method adopted for PWM controllers, which again presents the problems of dimensions and weights as is typical for the electromagnetic solutions.

U.S. Pat. No. 4,456,855 discloses a light regulator, especially a light regulator which is suitable for the regulation of the light intensity of both compensated and uncompensated illuminators connected to an alternating-current mains, said regulator having one or a plurality of switch elements fitted in a circuit between the mains and the illuminator, as well as a control circuit for a switch element or elements which in the course of the regulation intensity switches off the supply current at least once on each half cycle when the current has been conducted from the 0-moment of a half cycle to the moment according to a set value.

The main disadvantage of U.S. Pat. No. 4,456,855 is that it does not take into consideration the different behaviour of loads of different nature, thus it does not permit a good regulation strategy.

SUMMARY OF THE INVENTION

It is an object of the present invention to overcome the above drawbacks by providing a centralized control device for controlling the voltage applied to a load having power factor correction capacitors, in particular, for use in lighting engineering applications, which control device is improved and performs better than prior art solutions.

In this framework, it is the main object of the present invention to provide a centralized device for controlling the supply voltage to a load having power factor correction capacitors, in particular for lighting engineering applications, which is able to control the load voltage through a phase cut-off technique when using power factor correction capacitors, without the use of outlet filters, so the device can be applied to lighting systems and manufactured according to standard criteria.

In order to achieve such aims, it is the object of the present invention to provide a centralized device for controlling the supply voltage to a load having power factor correction capacitors, in particular for lighting engineering applications, incorporating the features of the annexed claims, which form an integral part of the description herein.

Further objects, features and advantages of the present invention will become apparent from the following detailed description and annexed drawings, which are supplied by way of non limiting example, wherein:

DESCRIPTION OF THE DRAWINGS

FIGS. 4a, 4b, 4c, 4d show a representation of the operational states of the preferred embodiment of the invention, in particular a conduction state and locking state of the control device for controlling the supply voltage to a load having power factor correction capacitors, according to the present invention.

DESCRIPTION OF THE PREFERRED EMBODIMENT

Figure 1:
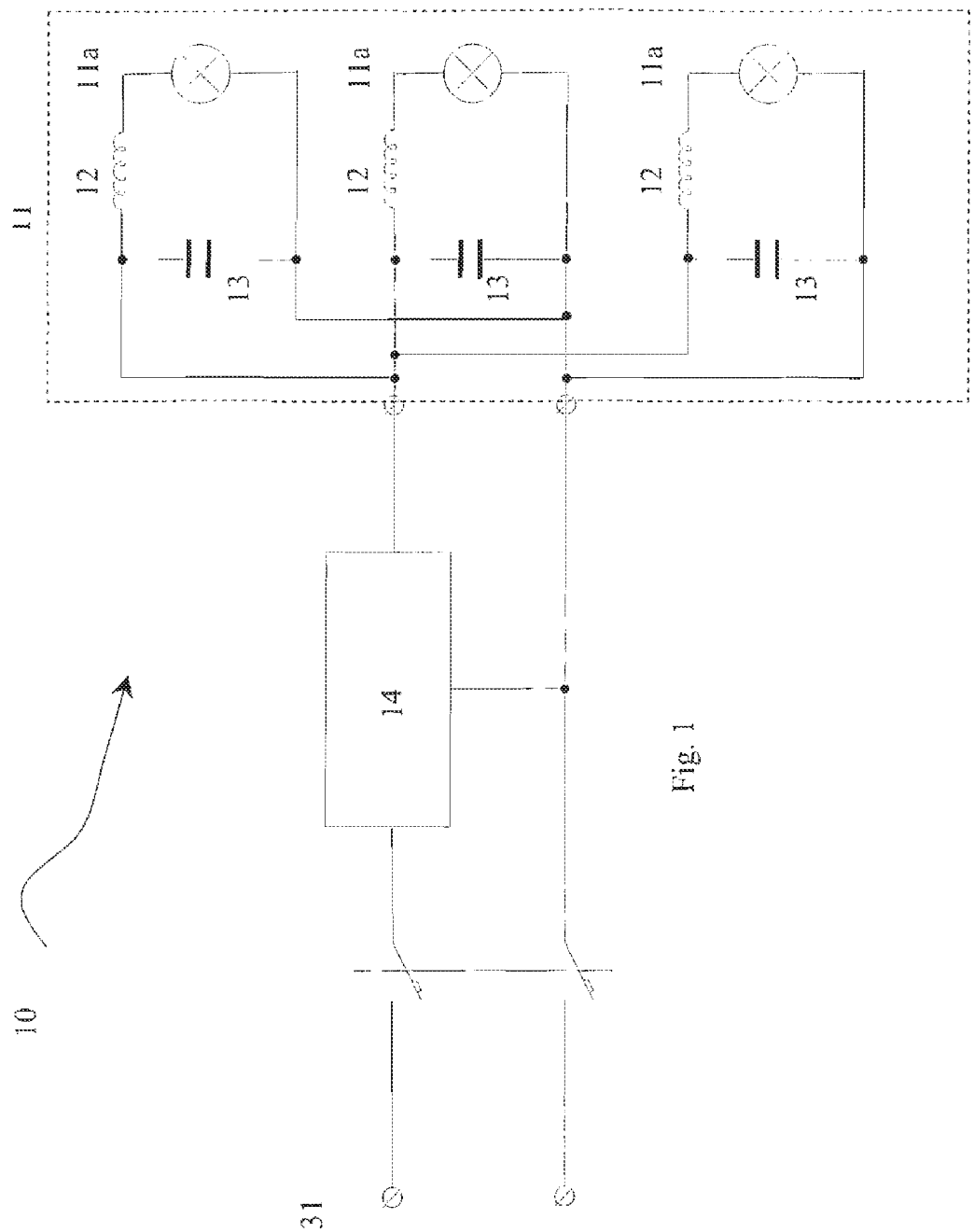
FIG. 1 shows a schematic view of a lighting system with a centralized control device for controlling the supply voltage to a load having power factor correction capacitors, according to the present invention.

FIG. 1 illustrates a lighting system 10 having power supply terminals 31 connected to a supply network, not illustrated. This lighting system includes a load 11, which is modelled and represented by a variable number of discharge lamps 11a fitted with a feeder 12 and power factor correction capacitor 13. The load 11 is supplied by a single-phase alternating voltage through the terminals 31.

The lighting system 10 comprises an electronic power device 14 located between the terminals 31 and the load 11 for controlling and choking the power supplied to said load 11, according to requirements.

Figure 2:
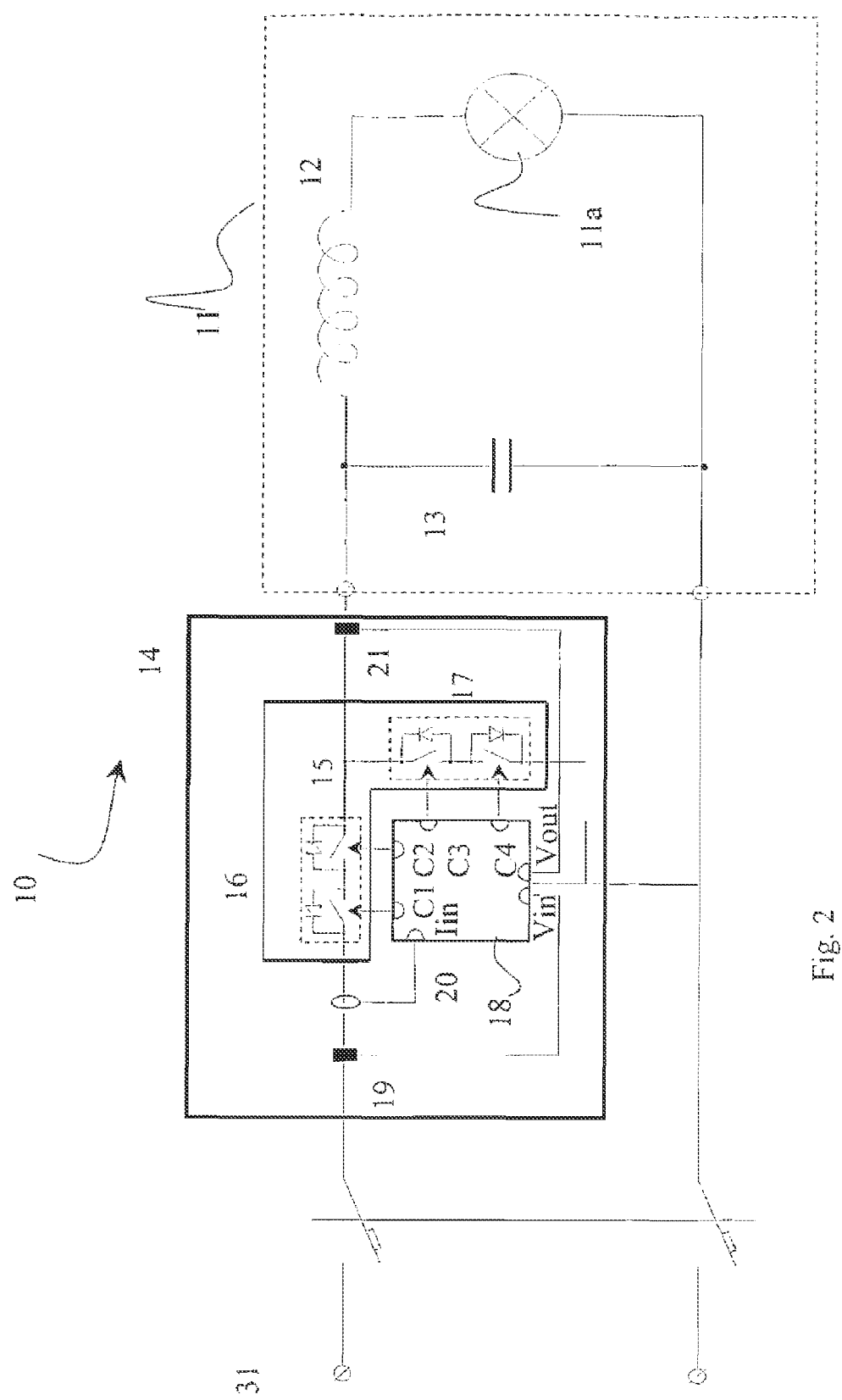
FIG. 2 shows a basic schematic of the centralized control device for controlling the supply voltage to a load having power factor correction capacitors, according to the present invention.

In FIG. 2, where the lighting system 10 of FIG. 1 is better detailed, the load consisting of multiple lamps 11a is converted to an equivalent lamp also indicated with 11a, for simplicity's sake.

According to the present invention, the electronic power device 14 located between the terminals 31 and the load 11 consists substantially of an array converter 15, comprising two bi-directional switches 16 and 17 interlaying between the terminals 31 and the load 11, connected in series and in parallel to said load 11, respectively; the electronic power device 14 also comprises a control and regulation system 18 for controlling the operation of said bi-directional switches 16 and 17.

Said electronic power device 14 operates according to a phase cut-off strategy, i.e. connecting the load 11 to the supply network only in line with the phase angles selected by the control and regulation device 18 based on regulation requirements.

According to the present invention, the electronic power device 14 operates according to a phase cut-off technique as mentioned above, i.e. indicating with 0° the through point for zero network voltage, while the electronic power device 14 will maintain the load 11 connected to the supply 31 for a portion only of the initial electric 180° of the sine curve identifying the supply phase, so as to let power through between the supply network itself and the load 11 according to one of the diagrams detailed in the FIGS. 4a and 4b. This operating procedure is repeated in the subsequent electric 180°, i.e. it is applied to both the positive half wave and negative half wave of the supply voltage.

The control and regulation system 18 calculates the exact time for interruption of the connection between the power supply and the load 11, i.e. it operates the appropriate phase cut-off for obtaining the load voltage requested by the control phase and cause deactivation of the bi-directional switch 16 connected in series to the supply. As it can be noticed in FIG. 4a, the bi-directional switch 16 consists of two unidirectional electronic switches 51 and 52, in particular separately controlled transistors. Based on the network voltage and line current measurements performed upstream by proper voltage sensors 19 and downstream by the current sensors 20 and voltage sensors 21, communicating with three respective inlets Vin, Iin and Vout of the system 18, the control and regulation system 18 will select through the proper outlets C1 and C2 the electronic switch 51 or 52 of the switch 16 to be deactivated for actual circuit interruption, with a consequent zero setting of the current on the load 11.

Both the supply voltage and the voltage applied to the load 11 will start a phase in which they evolve depending on their features. In particular, the supply voltage continues its standard sinusoidal trend with both the voltage and frequency established by the supply network, whereas the voltage on the load 11 changes in accordance with the electrical characteristics of the load 11 itself.

Actually, three different voltage trends of the load 11 can be described:

- in the case of an ideally inductive load 11, said load 11 would tend to maintain unchanged the current flowing through it, causing a sudden change to the output voltage. In particular, for a current flowing out of the load 11 the voltage would be led towards negative values;
- in the dual case of an ideally capacitive load 11, the load 11 itself would tend to maintain the voltage unchanged with respect to the voltage corresponding to the time the circuit has been interrupted;
- in the case of an ideally resistive load 11, both the load voltage and current would instantly go out as the main switch is deactivated, and allow restart of the same mechanism in the subsequent half cycle of the supply voltage.

As known, in real applications the load 11 has in intermediate behaviour between the inductive, capacitive and resistive behaviours. The control and regulation device 18 is provided for obtaining a condition at the end of each regulation cycle, which ensures a restart of the control strategy, as described in the example of an ideal resistive load. In order to obtain this situation, the device 14 has the bi-directional switch 16 connected in series to the supply and the further bi-directional switch 17 connected in parallel to the load 11, according to the diagram known as "array converter".

As said above, the purposes of the switch 16 connected in series to the supply is to connect the load 11 to the network, whereas the switch 17 in parallel to the load 11 will provide an alternative path to the current established by the inductive portion of the load 11 once the switch in series 16 is open, in order to ensure control of an over-voltage caused by the load 11 itself.

In the device 14 according to the present invention special attention is given to the time a connection is executed between the load 11 and the supply network, since both the supply network and converter 13 of the load 11 behave like ideal voltage generators during the connection transitory, both tending to establish the voltage to the remaining circuit. In view of this feature, even small calculation faults from an electric standpoint of the activation time, such as small voltage differences between the load 11 and the supply network, may lead to uncontrolled current impulses incompatible with the devices forming the circuit. For this reason all activations should be provided in advance and the actual closure of the electric circuits always be caused by the natural evolution of the circuit itself. The control and regulation device 18 is provided to this purpose, i.e. presetting activation of the switch 51 or 52 at every regulation cycle, which is put in a conduction state by the circuit voltages and currents. In other words, the control and regulation device 18 operates on the control terminal of the transistors presetting them for conduction at the time the appropriate voltage conditions are obtained on their emitters and collectors.

As it can be better noticed in FIG. 4a, the switch in series 16 consists of a transistor 51, whose collector is connected to the supply and the emitter is connected to the emitter of a transistor 52, having its collector connected to the load 11. The bases of said transistors 51 and 52 are driven by the outlets C1 and C2 of the control and regulation device 18, respectively. Each transistor has a protection diode in parallel.

The switch in parallel 17 consists in its turn of a transistor 53, whose collector is connected downstream to the switch in series 16, while the emitter is connected to the emitter of a transistor 54, having its collector connected to the neutral. The bases of said transistors 53e and 54 are driven by the outlets C3 and C4 of the control and regulation device 18, respectively.

As previously described, the load 11 consists of several elements, which can be schematically represented by the lamp 11a, where the inductance 12 in series with the lamp 11a represents the feeder, and a capacitor 13 in parallel with the lamp 11a is provided for raising the load power factor.

It is obvious how the behaviour of the circuit depends on the behaviour of all the elements forming it. These may change during the lamp and system life. In particular, the lamp 11a increases the arc voltage during its life, with a consequent circuit impedance increase. During the system life the power factor correction capacitors 13 undergo an ageing phenomenon, which reduces their capacity, whereas deactivation of a lamp or interruption of its circuit due to a burnt-out power supply or operation of a protection fuse, appears like an increase in the capacitance of the load to the voltage regulator.

FIGS. 4a, 4b, 4c and 4d illustrate the conduction and locking conditions established by the control and regulation device 18 through the bi-directional switches 16 and 17. As it can be noticed in FIG. 4a, the transistor 51 of the switch in series 16 is activated to let the current I through between the network and the load, while the transistor 52 is by-passed by means of the protection diode. On the contrary, the transistors 53 and 54 of the switch in parallel 17 remain deactivated.

In FIG. 4b, the transistor 52 of the switch in series 16 is activated for the current I to flow between the load and the network, while the transistor 51 is by-passed by means of the protection diode. The transistors 53 and 54 of the switch in parallel 17 remain deactivated.

In FIG. 4c, the transistor 54 of the switch in parallel 17 is activated for the current I to flow from the neutral to the load, whereas the transistor 53 is by-passed by means of the protection diode. The transistors 51 and 52 of the switch in parallel 16 remain deactivated.

In FIG. 4d, the transistor 53 of the switch in parallel 17 is activated for the current I to flow from the load to the neutral, whereas the transistor 54 is by-passed by means of the protection diode. The transistors 51 and 52 of the switch 16 in parallel remain deactivated.

In order to include all variables due to both the behaviour of the load 11 and current conduction possibilities of the device 14 in the above regulation strategy, the control and regulation device 18 has three different operating procedures, i.e. one for loads that are mainly inductive, one for loads that are mainly capacitive, and one for intermediate loads having a power factor around unity, which form the base of the control system called Adaptive Waveform Intersection (AWI).

Based on the voltage and current measurements through the sensors 19, 20 and 21, the regulation device 18 can automatically select the most correct operating procedure between the three above procedures and establish a correct through flow from one operation procedure to the other, always warranting a consistent supply to the load 11.

Capacitive mode: after the circuit interruption caused by the device 16, the voltage of the load 11 tends to maintain itself consistent. With reference to the positive half wave of the supply voltage, this evolution may cause a higher load voltage than the supply voltage; as a result, a sudden change of the load voltage would be required to bring both voltages back to the same value, with a consequent gating of a current impulse unacceptable for the electronic components. In order to avoid this situation, the control and regulation device 18 will first deactivate the unidirectional switch 51 conducting current according to the diagram of FIG. 4a and activate (FIG. 4b) the unidirectional switch 52 (both switches forming the switch in series 16); so, as soon as the load voltage tends to become higher than the network voltage, said transistor 52 becomes conductive according to the diagram of FIG. 4b, providing a circuit to let the current through between the load 11 and the network, as required.

Similarly, an exchange of the conduction conditions in the negative half wave also takes place between the diagrams of the FIGS. 4b and 4a.

Inductive mode: After the circuit interruption, the current through the load 11 tends to remain consistent. With reference to the positive half wave of the supply voltage, such an evolution may cause the load voltage to reach even higher negative values as an absolute value than the supply voltage itself. In order to avoid this situation, the control and regulation device 18 will first deactivate the unidirectional switch 51 conducting current according to the diagram of FIG. 4a, and activate (FIG. 4c) the unidirectional switch 54, which is able to conduct the current in the direction of the load current. Thus, the voltage on the load 11 is maintained around zero; at the subsequent passage for zero supply voltage, the device 14 can execute again a connection between the supply and the load without the risk of voltage differences.

Similarly, an exchange of the conduction conditions in the negative half wave also takes place between the diagrams of the FIGS. 4b and 4a.

As mentioned above, a connection between the supply network and the load cannot occur forcedly; therefore, it is necessary in line with the passage for zero supply voltage that the control and regulation device will activate the switch in series 16, conducting the supply voltage in the subsequent regulation cycle and deactivate the switch in parallel 17 conducting the current of the load 11 at a subsequent time only. Once the switch in parallel 17 is deactivated, the voltage of the load 11 evolves according to the conditions of the inductive, capacitive and resistive features of the load itself and starts conduction of one of the switches 51, 52 connected in series to the load previously activated. The free evolution of the load voltage starting from zero value for highly inductive loads may occur with a higher gradient than for the line voltage around zero value; therefore, advanced deactivation of the switch in parallel 17 with respect to the passage for zero supply voltage would cause higher values to the load voltage than the network values, with the consequent risk of a load voltage overelongation before the switch in series 16 returns to its conduction state. For this reason deactivation of the switch 17 in parallel to the load occurs after the passage for zero supply voltage. This phase is particularly delicate, due to a possible short-circuit between the supply phase and the neutral, typical for the diagrams utilizing array converters. The control and regulation device 18 is advantageously provided for establishing a state of the four transistors 51, 52, 53, 54 hindering this event.

Vice-versa, if deactivation of the switch 17 in parallel is delayed too long compared to the passage for zero network voltage, a condition can be reached during which no transistor will be conducting during the control cycle. This condition is detected by the control and regulation device 18, which causes a forced passage to an intermediate operation for the subsequent cycle, as described hereafter. In order to avoid this unusual operation mode, where no transistor is starting conduction, the control and regulation device 18 verifies at each cycle the phase shifting condition between the supply voltage and load current, thus being able to decide in advance the passage from the inductive mode to the intermediate mode.

Intermediate mode: the intermediate mode is quite similar to the inductive one; its substantial difference consists in being suitable for those situations where the load voltage gradient is smaller or equal to the gradient of the supply voltage after deactivation of the switch in parallel to the load itself. In this case, deactivation of the switch 17 in parallel occurs in advance compared to the passage for zero supply voltage, so the load voltage will equal the supply voltage during the subsequent regulation cycle. Through the measurement of the output voltage the control and regulation device 18 verifies no overvoltages arise on the load voltage due to the free evolution of the latter, and in case of a such measured voltage increase it causes the passage to the inductive operation mode. The sequence of the conduction states, similarly to the inductive operation mode, is 4a, 4c, 4b, 4d.

Figure 3:
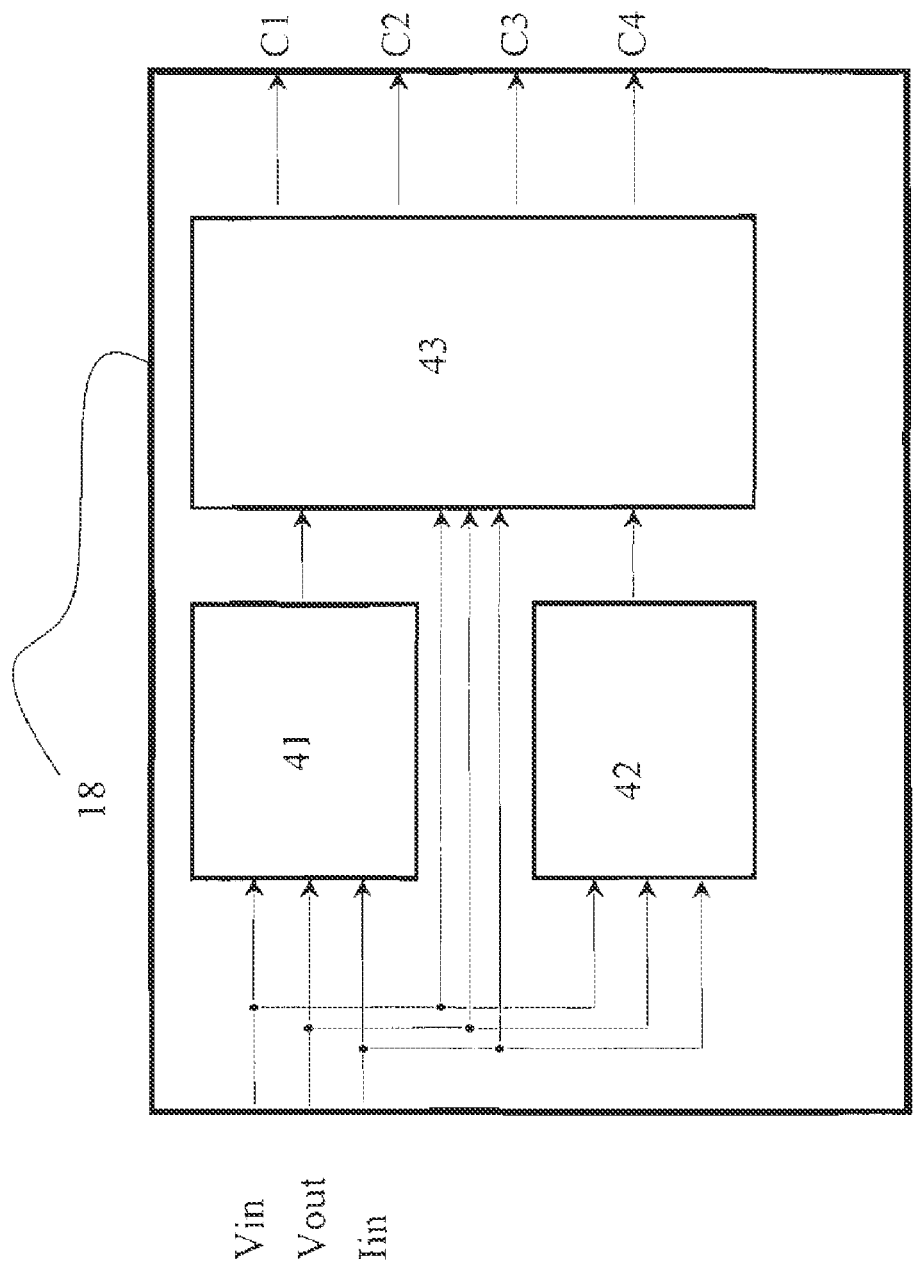
FIG. 3 shows a schematic view of the control device for controlling the supply voltage to a load having power factor correction capacitors, according to the present invention.

FIG. 3 is illustrating a detailed diagram of the control and regulation device 18, which provides input information about the network voltage, load current and voltage through the sensors 19, 20 and 21. Said information is sent to a selection block 41 of the operation mode, deactivation control block 42 and switching logic block 43. Blocks 41 and 42 control the block 43, which supplies the signals to the outlets C1, C2, C3, C4 for controlling the switches 16 and 17.

Based on the measured quantities, the block 41 detects the correct operation mode between the capacitive, inductive and intermediate mode, and supplies this information to the switching logic 43.

Based on the measured quantities, the block 42 calculates the phase angle for deactivation of the switch 16 in line with it and communicates it to the switching logic 43.

Based on the electric quantities, selected operation mode and deactivation time of the bi-directional switch 16, the switching logic 43 generates the activation controls C1, C2, C3 and C4 and the deactivation controls for the switches 51, 52, 53 and 54, respectively.

Thus, with the subsequent selection of the various operation modes and according to the so-called AWI system, the regulation device 18 ensures the control of the voltage applied to the load by means of the phase cut-off strategy. The amplitude of this cut-off is calculated by the control following a reference signal, which can be obtained by a request of operation voltage or through elaboration of a luminous sensor signal according to the type of lighting system under control.

From the above description the features of the present invention are clear, and also its advantages are clear.

The centralized controller for controlling the voltage applied to a load having power factor correction capacitors in particular for lighting engineering applications according to the present invention, advantageously ensures voltage control of the load with power factor correction capacitors through the so-called AWI system, without using output filters, so the device itself can be applied to lighting systems designed and manufactured according to standard criteria. Actually, the use of transistor switches in a converter structure driven by a suitable control system will advantageously adapt the converter structure to both the operation mode and transistors occurring in line with the phase cut-off operations.

It is obvious that many other changes are possible for the man skilled in the art of the centralized controller for controlling the voltage applied to a load having power factor correction capacitors, in particular for lighting engineering applications, described above by way of example, without departing from the novelty principles of the inventive idea, and it is also clear that in practical application of the invention the components may often differ from the ones described above, and be replaced with technically equivalent elements.

For instance, the transistors indicated as switching means can be bipolar transistors, MOSFET or any other electronic controlled switch.

The invention claimed is:

1. A centralized control device for controlling the voltage supplied to a load including a plurality of lamps provided with power factor correction capacitors, the control device being suitable for lighting engineering applications comprising:
   two input terminals for connection to a power supply network providing an alternating voltage,
   two output terminals for connection to the load,
   a power portion including a converter which has two bidirectional switches connected between the input terminals and the load, a first one of said bi-directional switches being connected in series with a supply input terminal for connecting the load to the supply network and the second one of said bi-directional switches being connected in parallel with the load,
   controlling and regulating means for managing the activation and deactivation states of said bidirectional switches,
   sensing means to which said controlling and regulating means are connected for measuring a voltage applied to the load, the supply network current and the supply network voltage,
   said controlling and regulating means automatically selecting the most correct operating procedure from among a plurality of operating procedures for different loads as a function of said voltage and current measurements.

2. A centralized control device according to claim 1, wherein said plurality of procedures consists of three predetermined operating procedures.

3. A centralized control device according to claim 1, wherein one of said operating procedures is for mainly capacitive loads.

4. A centralized control device according to claim 1, wherein one of said operating procedures is for mainly inductive loads.

5. A centralized control device according to claim 1, wherein one of said operating procedures is for intermediate loads which have a power factor of approximately unity.

6. A centralized control device according to claim 5, wherein another of said operating procedures is for mainly inductive loads and wherein said controlling and regulating means is adapted to switch from the operating procedure for the mainly inductive loads to the procedure for the intermediate loads and vice-versa, as a function of said current and voltage measurements.

7. A centralized control device according to claim 1, wherein each one of said two bidirectional switches comprises at least two transistors connected to each other by means of their emitters and provided with protection diodes.

8. A centralized control device according to claim 7, wherein said controlling and regulating means is provided with outputs electrically connected to control terminals of said transistors for operating them.

9. A centralized control device according to claim 8, wherein said controlling and regulating means comprises
   inputs operatively connected to the sensing means for receiving said current and voltage measurements,
   an operation mode selection block and a switching control block, operatively connected to said inputs for receiving said current and voltage measurements.

10. A centralized control device according to claim 9, wherein the controlling and regulating means further comprises a switching logic block operatively connected to said outputs for driving the switches, and said operation mode selection block and switching control block are operatively connected to a switching logic block for controlling it.

11. A centralized control device according to claim 10, wherein said operation mode selection block causes the switching logic block to select one of said operating procedures as a function of the current and voltage measurements.

12. A centralized control device according to claim 10, wherein said switching control block causes said switching logic block to deactivate said first switch at a phase angle which is a function of the current and voltage measurements.

13. A method for controlling the voltage supplied to a load including a plurality of lamps provided with power factor correction capacitors by controlling a converter which has a first bi-directional switch for connecting the load to a supply network providing an alternating supply voltage, and a second bi-directional switch connected in parallel with the load, said method comprising:
 measuring the voltage applied to the load, the supply network current and the supply network voltage,
 automatically selecting an operating procedure from among a plurality of operating procedures adapted for different loads, as a function of said current and voltage measurements, and
 controlling activation and deactivation of the first and second switches according to the selected operating procedure.

14. A method according to claim 13, wherein the switches are operated so that at the end of each half cycle of the supply voltage a condition wherein the load voltage is zero is obtained.

15. A method according to claim 14, wherein the first switch comprises two transistors connected to each other by means of their emitters and provided with protection diodes, so that in each half wave of the supply voltage only one transistor and the protection diode of the other transistor are conducting current, and during a half wave of the supply voltage, one transistor conducting current is deactivated and the other one is activated.

16. A method according to claim 15, wherein each one of the first and second switches comprise two transistors connected to each other by means of their emitters and provided with protection diodes, so that on each half wave of the supply voltage only one transistor and the protection diode of the other transistor are conducting current, and during a half wave of the supply voltage, a transistor of the first switch conducting current is deactivated and a transistor of the second switch is activated, the transistor of the second switch being able to conduct current in the direction of the load current, in order to maintain the voltage on the load around zero.

17. A method according to claim 16, comprising:
 activating the first switch for conducting the supply current during a subsequent regulation cycle, and
 subsequently deactivating the second switch after zero crossing of the supply network voltage.

18. A method according to claim 17, further comprising, in response to no transistors starting conduction during a regulation cycle, selecting a different operating procedure.

19. A method according to claim 17, wherein said different operation procedure comprises:
 activating the first switch for conducting the supply current to the subsequent regulation cycle, and
 subsequently deactivating the second switch before the supply voltage has reached zero.

* * * * *